(12) United States Patent
Xu et al.

(10) Patent No.: US 11,476,746 B2
(45) Date of Patent: Oct. 18, 2022

(54) ELECTROMECHANICAL ENERGY CONVERSION SYSTEM BASED ON DOUBLE CONDUCTOR

(71) Applicant: Shanghai University, Shanghai (CN)

(72) Inventors: Guoqing Xu, Shanghai (CN); Hua'nan Ge, Shanghai (CN); Xiaoyu Xu, Shanghai (CN)

(73) Assignee: Shanghai University, Shanghai (CN)

( * ) Notice: Subject to any disclaimer, the term of this patent is extended or adjusted under 35 U.S.C. 154(b) by 385 days.

(21) Appl. No.: 16/739,644

(22) Filed: Jan. 10, 2020

(65) Prior Publication Data
US 2021/0013788 A1    Jan. 14, 2021

(30) Foreign Application Priority Data
Jul. 11, 2019   (CN) .......................... 201910623017.5

(51) Int. Cl.
*H02K 41/03* (2006.01)
(52) U.S. Cl.
CPC ................. *H02K 41/031* (2013.01)
(58) Field of Classification Search
CPC ........ H02K 41/031; H02K 35/02; H02J 50/00
USPC ...................................................... 310/12.18
See application file for complete search history.

(56) References Cited

FOREIGN PATENT DOCUMENTS

| CN | 107453585 A | * 12/2017 | |
| CN | 111917260 A | * 11/2020 | |
| RU | 2752234 C2 | * 7/2021 | ............. H02K 17/26 |

* cited by examiner

*Primary Examiner* — Jianchun Qin
(74) *Attorney, Agent, or Firm* — Mintz Levin Cohn Ferris Glovsky and Popeo, P.C.

(57) ABSTRACT

A dual-conductor based electromechanical energy conversion system. The system includes an external force device, a moving object connecting frame, a moving object, a dual-conductor assembly and a platform connecting frame. The external force device is connected with the moving object through the moving object connecting frame. The dual-conductor assembly is arranged under the moving object in parallel. The dual-conductor assembly is connected with an external platform through the platform connecting frame. The moving object generates a relative motion with the dual-conductor assembly according to an external force. The dual-conductor assembly generates an alternating current according to an alternating magnetic field generated by the moving object.

7 Claims, 4 Drawing Sheets

FIG. 1
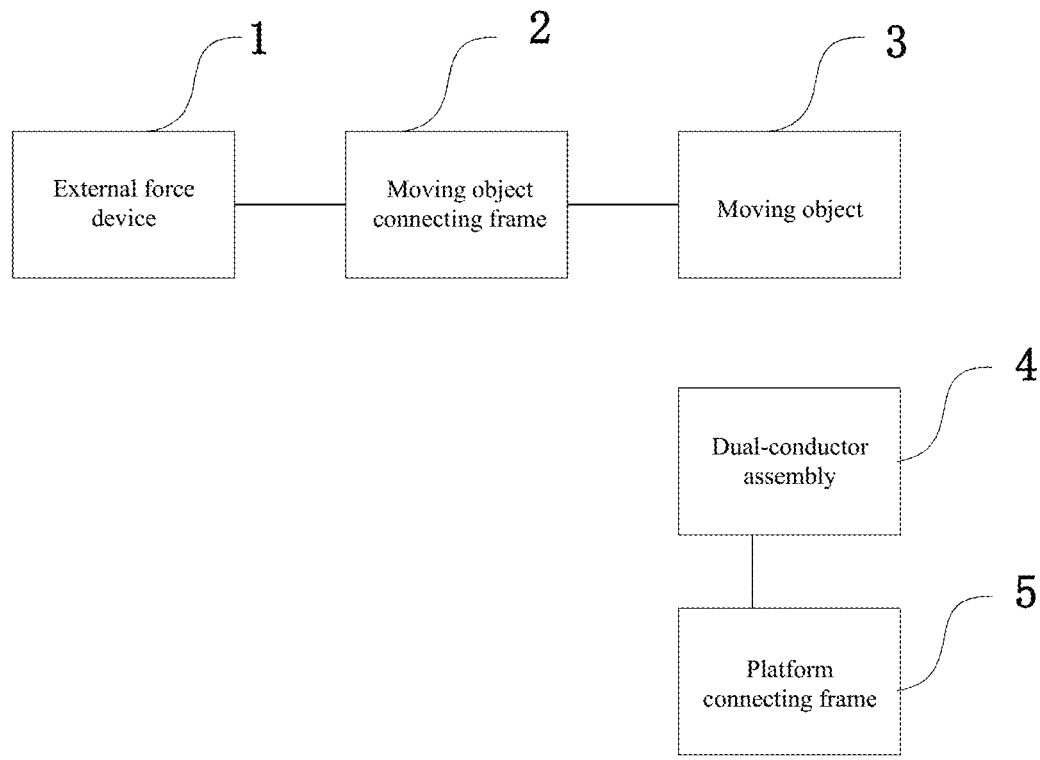
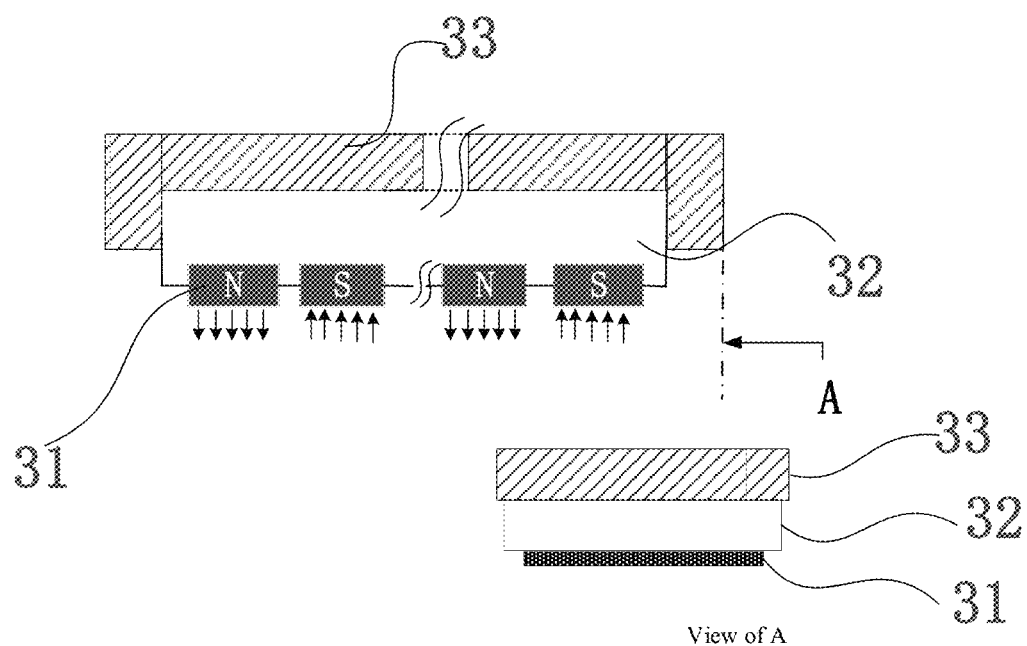
FIG. 2

ELECTROMECHANICAL ENERGY CONVERSION SYSTEM BASED ON DOUBLE CONDUCTOR

CROSS-REFERENCE TO RELATED APPLICATIONS

The present application claims priority to Chinese Patent Application No. 201910623017.5, filed Jul. 11, 2019, and entitled "Electromechanical Energy Conversion System Based On Double Conductor", and incorporates its disclosure herein by reference in its entirety.

TECHNICAL FIELD

The present invention relates to the field of electromechanical energy conversion, and in particular, to a dual-conductor based electromechanical energy conversion system.

BACKGROUND

A method of achieving electromechanical energy conversion by using an electromagnetic relation is widely applied to the fields of industry, civil, military, aerospace and the like. There is an obvious example: an electric machine (including an electric generator) is widely applied to an energy power apparatus and an automatic system. Especially in recent ten years, a permanent magnet motor is widely applied to the fields of a drive system of an electric vehicle, a robot and industrial servo system, wind power generation, a power generation system of a military vehicle and the like due to its multiple advantages of high efficiency, high power density, simple structure, reliable operation and the like.

With the daily wide application of the electric machine in more fields, people put forwards more and more requirements on light weight and miniaturization of the electric machine, which is represented by power density (or torque density) measured by unit weight or unit volume. By taking a drive motor for the electric vehicle as an example, the light weight and the miniaturization of the electric machine become an important technical index of development of the electric machine.

Based on the principle of electromechanics, it can be seen that a torque density index represents the light weight level of the electric machine unrelated to a rotational speed. The volume of the electric machine is related to factors, such as a torque of the electric machine at a rated operation point, an electromagnetic load, a cooling technology and the like. A cooling system aims to take away loss-caused heat of an interior of the electric machine from the electric machine such that the light weight is easier to be achieved by utilizing an oil cooling technology rather than a water cooling technology, and certainly, the costs are high. Therefore, how to reduce a heat loss of the electric machine during operation is an important way to improve the light weight level of the electric machine, and moreover, a low loss means high energy efficiency for the system.

The significance of implementation of a low-loss conducting technology can be seen from the pursuit of people to a superconducting technology. Currently, a practical superconducting technology operates under a low temperature environment, and a superconducting technology operating under a normal temperature environment needs to be further researched and developed. In the other aspect, a method of achieving low-loss conduction by innovation of materials technology is also greatly progressed. In 2004, professor Hjortstam puts forwards the concept of "ultra-conductive copper wire" based on composition of a carbon nanotube and a copper material, and the resistivity of the ultra-conductive copper wire is less than 50% of the resistivity of a pure copper material. In recent five years, the United States, Japan, Britain and other countries have made important progress in the preparation technology of graphene materials. Especially, a single-atom-thick carbon composite is successfully prepared by using a chemical vapor deposition method in 2015 by the Oak Ridge National Laboratory of the United States Department of Energy, so a problem of graphene sheet aggregation can be eliminated, and the ultra-conductive copper wire technology that the carbon nanotube material is attached on the copper material is greatly developed. Currently, such technology has complex manufacturing requirements and high material costs, and there is a long time to achieve its practical application.

SUMMARY

An objective of the present invention is to provide a dual-conductor based electromechanical energy conversion system, where dual parallel conductors generate an electromagnetic oscillation effect under the control of a magnetic field, and electromagnetic energy in the dual conductor is transmitted in the form of waves so as to reduce a Poynting vector to enter the conductor and achieve low/tiny loss of electrical energy transmission.

To achieve the above purpose, the present invention provides the following technical solution.

A dual-conductor based electromechanical energy conversion system includes an external force device, a moving object connecting frame, a moving object, a dual-conductor assembly and a platform connecting frame, where the external force device is connected with the moving object through the moving object connecting frame; the dual-conductor assembly is arranged under the moving object in parallel; the dual-conductor assembly is connected with an external platform through the platform connecting frame; and the moving object generates a relative motion with the dual-conductor assembly according to an external force, and the dual-conductor assembly generates an alternating current according to an alternating magnetic field generated by the moving object.

Optionally, the moving object includes permanent magnets, a first magnetic core and a moving object shell; the first magnetic core is arranged in the moving object shell; the first magnetic core is provided with a plurality of first grooves; the permanent magnets are alternatively arranged in the first grooves according to polarity; and the moving object shell is connected with the external force device through the moving object connecting frame.

Optionally, the dual-conductor assembly includes dual conductors and a second magnetic core, and a plurality of second grooves are opened in the second magnetic core; the dual conductor is fixed in the second groove; and the second magnetic core is connected with the external platform through the platform connecting frame.

Optionally, the dual conductor includes multiple basic conductor units and end conductors; the multiple basic conductor units are arranged in the second grooves at a fixed interval; the basic conductor unit includes an input terminal and an output terminal; and the multiple basic conductor units are connected through the end conductors.

Optionally, the basic conductor unit includes an upper-layer conductor and a lower-layer conductor; the upper-layer conductor and the lower-layer conductor are made of metal materials; and the upper-layer conductor and the lower-layer conductor each are coated with an insulating layer.

Optionally, the upper-layer conductor and the lower-layer conductor include an input terminal and an output terminal; the input terminal of the upper-layer conductor and the output terminal of the lower-layer conductor are located on the same side; and the output terminal of the upper-layer conductor and the input terminal of the lower-layer conductor are located on the same side.

Optionally, a length of a magnetic field, generated by the moving object, acting on the axial direction of the basic conductor unit is less than a width of the second magnetic core.

Optionally, the section of the basic conductor unit is circular or rectangular.

Optionally, the direction of magnetic line of force is vertical to the basic conductor unit due to a magnetic field of the permanent magnets; and the central distance of adjacent permanent magnets is equal to the central distance of the basic conductor units.

Optionally, a gap between adjacent two permanent magnets is consistent with a width of the dual conductor.

Compared with the prior art, the present invention has the following technical effects: a moving object generates an alternating magnetic field vertical to conductors and generates a relative motion with the dual conductor under the drive of an external power, and a magnetic line of force cut the conductors of a dual-conductor assembly to generate an alternating electromotive force between an upper conductor and a lower conductor of the dual conductor. The dual conductor is connected with a load (such as a resistor, a storage battery and the like) so as to form an alternating current in the load and the dual conductor. The alternating current and the alternating magnetic field are mutually acted to generate an electromagnetic torque on the conductors, and the direction of the electromagnetic torque and the direction of an external force torque are opposite. Mechanical energy inputted by an external force is converted into electrical energy. The present invention uses control of a magnetic field, namely special design and control of the magnetic field, to produce additive high-frequency potential pulses on the dual parallel conductors, the conductor generates an electromagnetic oscillation effect, charges of the conductor generate accumulation-dissipation oscillation, charges originally mussy moving portions of the conductor are orderly, and the internal electromagnetic energy of the dual conductor are transmitted in the form of the waves such that the Poynting vector entering the conductor is greatly reduced, and low/tiny loss of the electrical energy transmission is achieved.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a structural block diagram of a dual-conductor based electromechanical energy conversion system according to an embodiment of the present invention.

FIG. 2 is a schematic structural diagram of a moving object according to an embodiment of the present invention.

DETAILED DESCRIPTION

Figure 3:
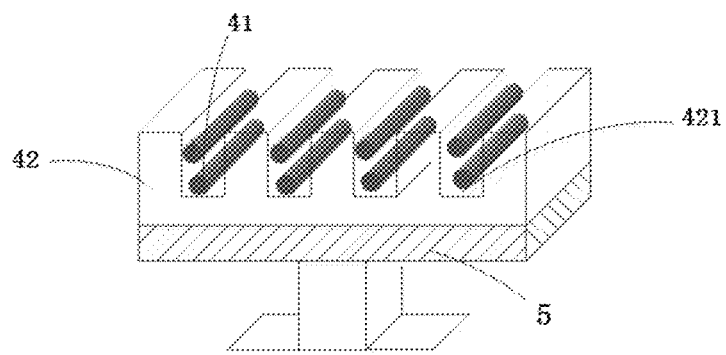
FIG. 3 is a schematic structural diagram of a dual-conductor assembly according to an embodiment of the present invention.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a dual-conductor based electromechanical energy conversion system, where dual parallel conductors generate an electromagnetic oscillation effect under the control of a magnetic field, and electromagnetic energy in the dual conductor is transmitted in the form of waves so as to reduce a Poynting vector to enter the conductor and achieve low/tiny loss of electrical energy transmission.

To make the foregoing objective, features, and advantages of the present invention clearer and more comprehensible, the present invention is further described in detail below with reference to the accompanying drawings and specific embodiments.

As shown in FIG. 1, the dual-conductor based electromechanical energy conversion system includes an external force device 1, a moving object connecting frame 2, a moving object 3, a dual-conductor assembly 4 and a platform connecting frame 5. The external force device 1 is connected with the moving object 3 through the moving object connecting frame 2; the dual-conductor assembly 4 is arranged under the moving object 3 in parallel; the dual-conductor assembly 4 is connected with an external platform through the platform connecting frame 5; the moving object 3 generates a relative motion with the dual-conductor assembly 4 according to an external force, and the dual-conductor assembly 4 generates an alternating current according to an alternating magnetic field generated by the moving object.

As shown in FIG. 2, the moving object 3 includes permanent magnets 31, a first magnetic core 32 and a moving object shell 33; the first magnetic core 32 is arranged in the moving object shell 33; the first magnetic core 32 is provided with a plurality of first grooves; the permanent magnets 31 are alternatively arranged in the first grooves according to polarity; and the moving object shell 33 is connected with the external force device 1 through the moving object connecting frame 2. Permanent magnetic steels (namely the permanent magnets 31) alternatively arranged according to the polarity are mounted on one side face of the moving object 3, and a direction of a generated magnetic field (namely magnetic line of force) is vertical to the surfaces of the permanent magnetic steels, namely a plane of the moving object 3. The moving object 3 moves in a sequential arrangement direction of the permanent magnetic steels under the drive of the external force to generate an alternating magnetic field in a space (a position) under the permanent magnets 31.

As shown in FIG. 3, the dual-conductor assembly 4 includes dual conductors 41 and a second magnetic core 42, and a plurality of second grooves 421 are opened in the second magnetic core 42; the dual conductor 41 is fixed in the second groove 421; and the second magnetic core 42 is connected with the external platform through the platform connecting frame 5.

Figure 4:
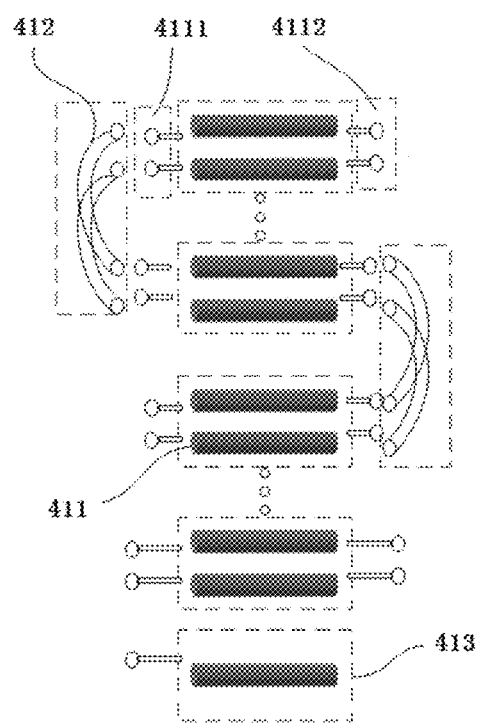
FIG. 4 is a schematic structural diagram of dual conductors according to an embodiment of the present invention.

As shown in FIG. 4, the dual conductor 41 includes multiple basic conductor units 411 and end conductors 412; and the multiple basic conductor units 411 are arranged in the second grooves 421 at a fixed interval. The fixed interval means that the number of grooves between two adjacent basic conductor units is constant, may be zero (that is, the basic conductor units are continuously arranged in a sequence of the grooves), and may be nonzero (such as 2, that is the basic conductor units are arranged at every two grooves in the sequence of the grooves). The basic conductor unit 411 includes an input terminal 4111 and an output terminal 4112; and the multiple basic conductor units 411 are connected through the end conductors 412. Each basic conductor unit has an input terminal and an output terminal, and the output terminal of a previous basic conductor unit is connected with the input terminal of a next basic conductor unit. Each basic conductor unit is connected with the previous basic conductor unit and the next basic conductor unit through the end conductor in a manner of winding or welding by using the same conductor. Different from a general basic conductor unit in which two conductors are arranged up and down, the first basic conductor unit 413 has only one conductor.

Figure 5:
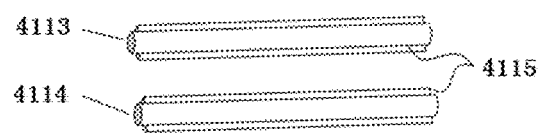
FIG. 5 is a schematic structural diagram of a basic conductor unit according to an embodiment of the present invention.
Figure 11:
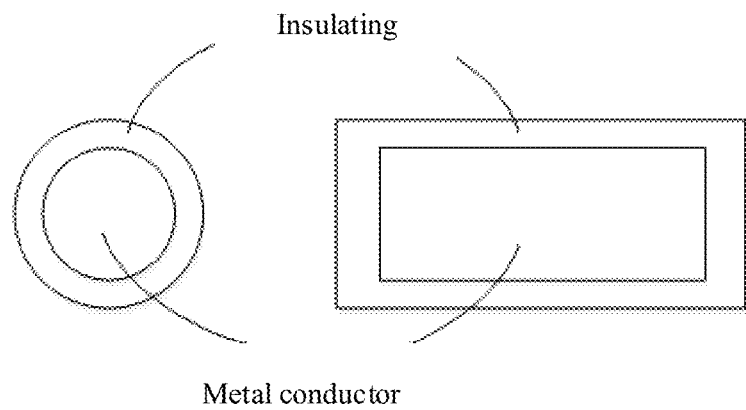
FIG. 11 is a schematic diagram showing a section of a basic conductor unit according to an embodiment of the present invention.

As shown in FIG. 5, the basic conductor unit 4115 includes an upper-layer conductor 4113 and a lower-layer conductor 4114; the upper-layer conductor 4113 and the lower-layer conductor 4114 are made of metal materials; and the upper-layer conductor and the lower-layer conductor each are coated with an insulating layer. As shown in FIG. 11, the section of the basic conductor unit 411 is circular or rectangular.

The input terminal 4111 and the output terminal 4112 of the basic conductor unit have two incoming (outgoing) line terminals; the upper-layer conductor 4113 and the lower-layer conductor 4114 of each basic conductor unit correspond to one incoming line terminal and one outgoing line terminal; the end conductor is formed by an upper-layer portion and a lower-layer portion; and the upper-layer conductor 4113 of each basic conductor unit corresponds to the upper-layer portion of the end conductor while the lower-layer conductor 4114 of each basic conductor unit corresponds to the lower-layer portion of the end conductor. The upper-layer (lower-layer) conductor of each basic conductor unit is connected with the upper-layer (lower-layer) conductor of the previous basic conductor unit and the upper-layer (lower-layer) conductor of the next basic conductor unit through the upper-layer (lower-layer) portion of the end conductor. The upper-layer conductors and the lower-layer conductors of all the basic conductor units are sequentially connected, the last basic conductor unit respectively has an outgoing line terminal and an incoming line terminal to form a total output terminal (double line terminals) of a power generation system, and the upper-layer conductors and the lower-layer conductors of all the basic conductor units and the single conductor of the first basic conductor unit are connected to form a series connection relation.

Figure 6:
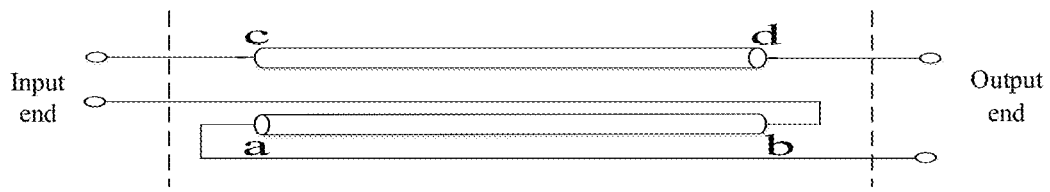
FIG. 6 is a schematic diagram of input terminals and output terminals of a basic conductor unit according to an embodiment of the present invention.

As shown in FIG. 6, the upper-layer conductor and the lower-layer conductor include an input terminal and an output terminal; the input terminal c of the upper-layer conductor and the output terminal a of the lower-layer conductor are located on the same side; and the output terminal d of the upper-layer conductor and the input terminal b of the lower-layer conductor are located on the same side.

Figure 7:
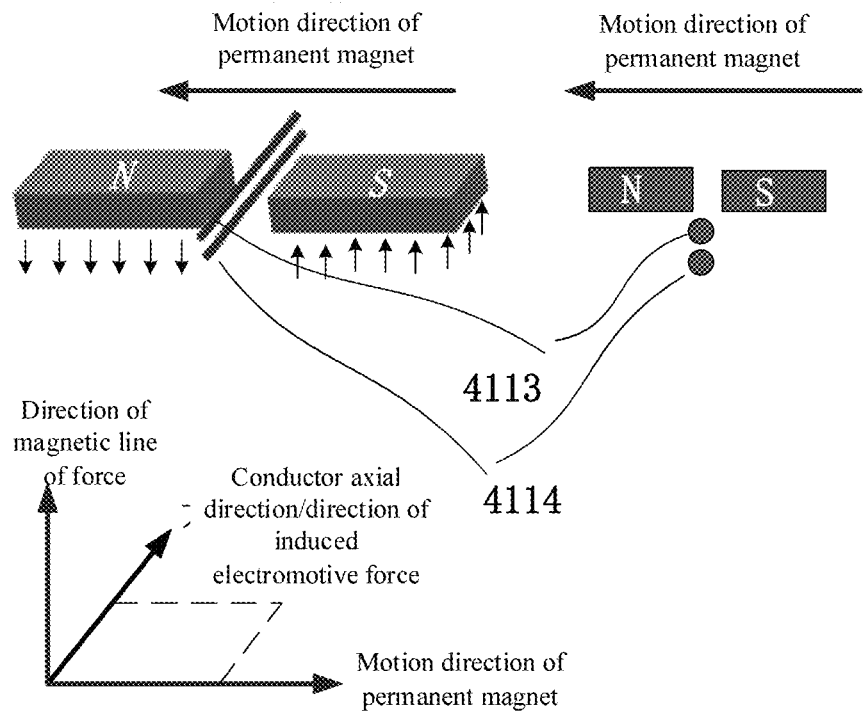
FIG. 7 is a schematic diagram showing a direction of magnetic line of force of a magnetic field generated by a moving object according to an embodiment of the present invention.

As shown in FIG. 7, the direction of magnetic line of force is vertical to the basic conductor unit due to the magnetic fields of the permanent magnets 31 alternatively arranged according to the polarity. Under the action of the external force, when the moving object 3 moves in the direction of alternative arrangement of the permanent magnetic steels, the magnetic line of force vertical to the upper-layer conductor and the lower-layer conductor of the basic conductor unit cuts the conductors to generate induced electromotive force in the axial direction of the conductors.

Figure 8:
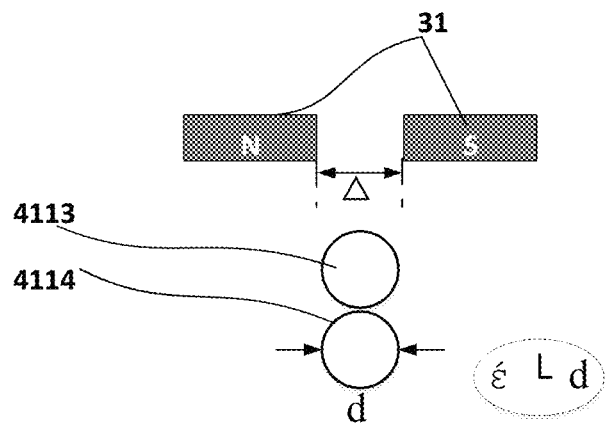
FIG. 8 is a schematic diagram showing a gap between adjacent magnetic fields of a moving object formed by permanent magnetic steels according to an embodiment of the present invention.

As shown in FIG. 8, according to the permanent magnetic steels alternatively arranged according to the polarity in the motion direction, a gap between two adjacent permanent magnetic steels is basically consistent with a width d of the dual conductor. An objective of the above arrangement is: the conductors are located in a magnetic polarity alternating region to generate a greater magnetic field alternating slope so as to generate sudden potential at conductor ends of the dual conductor and to ensure that the basic conductor units arranged in the grooves in parallel generate charge oscillation in the axial direction.

Figure 9:
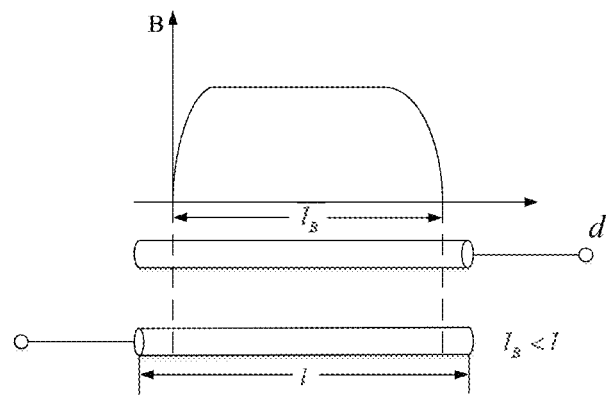
FIG. 9 is a schematic diagram showing a waveform of a magnetic field of a moving object according to an embodiment of the present invention.

As shown in FIG. 9, a length $l_B$ of a magnetic field, generated by the moving object 3, acting on the axial direction of the basic conductor unit 411 is less than a width l of the second magnetic core 42. An objective of the above arrangement is: the conductors are located in a magnetic polarity alternating region to generate a greater magnetic field alternating slope so as to generate sudden potential at conductor ends of the dual conductor and to ensure that the basic conductor units arranged in the grooves in parallel generate charge oscillation in the axial direction.

Adjacent permanent magnets arranged on the moving object respectively correspond to two adjacent basic conductor units, that is, the central distance of adjacent permanent magnets is equal to the central distance of the basic conductor units. It is ensured that magnetic field induced electromotive forces in the series-connection basic conductor units form a superposition relation.

The above objective can be achieved in two aspects of design and control of the magnetic field. In one aspect of the design of the magnetic field, the width of the dual conductor in the opened groove is close to a gap between two permanent magnets in an adjacent N, S permanent magnet polarity alternating region of the permanent magnetic field, so the alternating slope of the magnetic field can be increased. In one aspect of the control of the magnetic field, current of the dual conductor is controlled, for example, a current pulse is superposed on the basis of the external magnetic field (which is generated by the permanent magnets 31), so the alternating slope of the magnetic field can also be increased.

Under the excitation of the alternating magnetic field, the alternating magnetic field contains high-frequency alternating part, and the magnetic field has a rapid attenuation characteristic in an axial length of the conductor, that is, the pulse potential is applied to the conductor ends to generate a rapid accumulation effect of end charges and a special capacitance effect on the closely arranged dual conductors, and under the action of the capacitance effect, the current of the conductor is transmitted in traveling waves.

The current transmitted on the conductor is a traveling wave such that the distribution of charges on the surface of the conductor are uneven, the charges generate rapid accumulation-dissipation oscillation, and the motion of the charges in the conductor is more orderly. The direction of an electric field between the conductors is basically (mostly) vertical to the surfaces of the conductors, the Poynting vector entering the conductors is greatly reduced, and a little of the electromagnetic energy in the current transmission procedure of the dual conductor enters the interiors of the conductors, so the heat loss of the conductors is greatly reduced.

Figure 10:
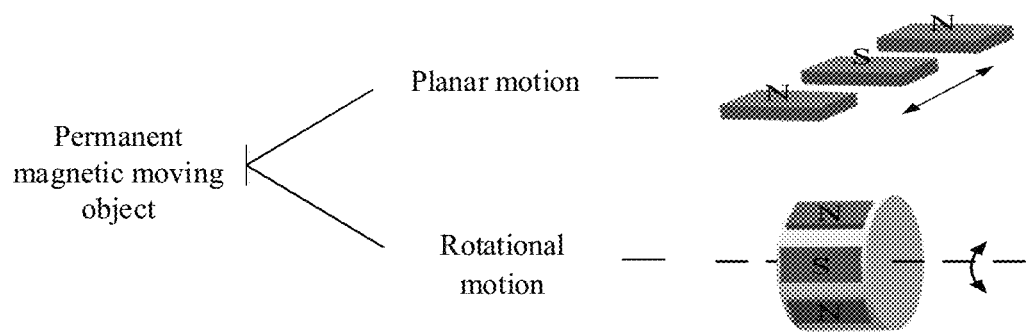
FIG. 10 is a schematic diagram showing two structures of a moving object formed by permanent magnetic steels according to an embodiment of the present invention.

As shown in FIG. 10, the moving object 3 and the dual-conductor assembly 4 can form a rotation motion in a cylindrical wall structure, and correspondingly, the dual-conductor assembly 4 has a cylindrical structure.

According to specific embodiments provided by the present invention, the present invention has the following technical effects: the moving object generates an alternating magnetic field vertical to the conductors and generates a relative motion with the dual conductor under the drive of the external power, and the magnetic line of force cut the conductors of the dual-conductor assembly to generate an alternating electromotive force between the upper conductor and the lower conductor of the dual conductor. The dual conductor is connected with a load (such as a resistor, a storage battery and the like) so as to form an alternating current in the load and the dual conductor. The alternating current and the alternating magnetic field are mutually acted to generate an electromagnetic torque on the conductors, and the direction of the electromagnetic torque and the direction of an external force torque are opposite. Mechanical energy inputted by an external force is converted into electrical energy. The present invention uses control of a magnetic field, namely special design and control of the magnetic field, to produce additive high-frequency potential pulses on the dual parallel conductors, the conductor generates an electromagnetic oscillation effect, charges of the conductor generate accumulation-dissipation oscillation, charges originally mussy moving portions of the conductor are orderly, and the internal electromagnetic energy of the dual conductor are transmitted in the form of the waves such that the Poynting vector entering the conductor is greatly reduced, and low/tiny loss of the electrical energy transmission is achieved.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A dual-conductor based electromechanical energy conversion system, comprising:
    an external force device;
    a moving object connecting frame;
    a moving object;
    a dual-conductor assembly; and
    a platform connecting frame;
    wherein the external force device is connected with the moving object through the moving object connecting frame;
    the dual-conductor assembly is arranged under the moving object in parallel;
    the dual-conductor assembly is connected with an external platform through the platform connecting frame; and
    the moving object generates a relative motion with the dual-conductor assembly according to an external force, and the dual-conductor assembly generates an alternating current according to an alternating magnetic field generated by the moving object; wherein
    the moving object comprises permanent magnets, a first magnetic core and a moving object shell; the first magnetic core is arranged in the moving object shell; the first magnetic core is provided with a plurality of first grooves; the permanent magnets are alternatively arranged in the first grooves according to polarity; and the moving object shell is connected with the external force device through the moving object connecting frame;
    the dual-conductor assembly comprises dual conductors and a second magnetic core, and a plurality of second grooves are opened in the second magnetic core; the dual conductor is fixed in the second groove; and the second magnetic core is connected with the external platform through the platform connecting frame; and
    a gap between two adjacent permanent magnets is consistent with a width of the dual conductor.

2. The dual-conductor based electromechanical energy conversion system according to claim 1, wherein the dual conductor comprises multiple basic conductor units and end conductors;
    the multiple basic conductor units are arranged in the second grooves at a fixed interval;
    the basic conductor unit comprises an input terminal and an output terminal; and
    the multiple basic conductor units are connected through the end conductors.

3. The dual-conductor based electromechanical energy conversion system according to claim 2, wherein the basic conductor unit comprises an upper-layer conductor and a lower-layer conductor;
    the upper-layer conductor and the lower-layer conductor are made of metal materials; and
    the upper-layer conductor and the lower-layer conductor each are coated with an insulating layer.

4. The dual-conductor based electromechanical energy conversion system according to claim 3, wherein the upper-layer conductor and the lower-layer conductor comprise an input terminal and an output terminal;
- the input terminal of the upper-layer conductor and the output terminal of the lower-layer conductor are located on the same side; and
- the output terminal of the upper-layer conductor and the input terminal of the lower-layer conductor are located on the same side.

5. The dual-conductor based electromechanical energy conversion system according to claim 2, wherein a length of a magnetic field, generated by the moving object, acting on the axial direction of the basic conductor unit is less than a width of the second magnetic core.

6. The dual-conductor based electromechanical energy conversion system according to claim 2, wherein the section of the basic conductor unit is circular or rectangular.

7. The dual-conductor based electromechanical energy conversion system according to claim 2, wherein the direction of magnetic line of force is vertical to the basic conductor unit due to a magnetic field of the permanent magnets; and
- the central distance of adjacent permanent magnets is equal to the central distance of the basic conductor units.

* * * * *